(12) United States Patent
Lee et al.

(10) Patent No.: US 8,238,343 B2
(45) Date of Patent: Aug. 7, 2012

(54) METHOD AND APPARATUS OF PERFORMING TUNNEL SIGNALING OVER IP TUNNELING PATH

(75) Inventors: Sung-Hyuck Lee, Daegu (KR);
Jong-Ho Bang, Suwon-si (KR);
Henning Schulzrinne, Leonia, NJ (US);
Charles Qi Shen, New York, NY (US)

(73) Assignees: Samsung Electronics Co., Ltd., Suwon-si (KR); The Trustee of Columbia University in the City of New York, New York, NY (US)

( * ) Notice: Subject to any disclaimer, the term of this patent is extended or adjusted under 35 U.S.C. 154(b) by 846 days.

(21) Appl. No.: 11/582,491

(22) Filed: Oct. 18, 2006

(65) Prior Publication Data
US 2007/0109966 A1 May 17, 2007

Related U.S. Application Data

(60) Provisional application No. 60/728,749, filed on Oct. 21, 2005.

(30) Foreign Application Priority Data
Jun. 9, 2006 (KR) .................. 10-2006-0052065

(51) Int. Cl.
*H04W 4/00* (2009.01)
*H04L 12/28* (2006.01)
(52) U.S. Cl. ............... 370/395.2; 370/331; 370/397; 370/395.3; 370/401

(58) Field of Classification Search .................. None
See application file for complete search history.

(56) References Cited

U.S. PATENT DOCUMENTS

| | | | |
|---|---|---|---|
| 6,519,254 B1* | 2/2003 | Chuah et al. .................. 370/389 |
| 2003/0118029 A1* | 6/2003 | Maher et al. .............. 370/395.21 |
| 2004/0008689 A1 | 1/2004 | Westphal et al. ......... 370/395.21 |
| 2004/0095912 A1* | 5/2004 | Gao et al. ....................... 370/338 |
| 2004/0170156 A1* | 9/2004 | O'Neill .......................... 370/349 |
| 2005/0047340 A1 | 3/2005 | Babiarz et al. ................. 370/231 |

FOREIGN PATENT DOCUMENTS
EP  1 521 405 A1  4/2005

OTHER PUBLICATIONS
Terzis et al. "RSVP Operations over IP tunnels", RFC 2746, Jan. 2000.*

(Continued)

*Primary Examiner* — Anh-Vu H Ly
*Assistant Examiner* — Thinh Tran
(74) *Attorney, Agent, or Firm* — NSIP Law

(57) ABSTRACT

An apparatus and method for performing tunnel signaling over an IP tunneling path are provided. The method includes transmitting an end-to-end signaling flow through an end-to-end path connected to the IP tunneling path, generating a tunnel signaling flow corresponding to the end-to-end signaling flow, and transmitting the generated tunnel signaling flow through the IP tunneling path, wherein the end-to-end signaling flow and the tunnel signaling flow respectively include a binding data object storing binding information for an end-to-end session associated with the end-to-end signaling flow or a tunnel session associated with the tunnel signaling flow.

26 Claims, 5 Drawing Sheets

OTHER PUBLICATIONS

Andreas Terzis et al.; Reservations for Aggregate Traffic: Experiences from an RSVP Tunnels Implementation; University of California, Los Angeles, CA; pp. 1-3.

F. Baker et al.; Aggregation of RSVP for IPv4 and IPv6 Reservations; Network Working Group Request for Comments: 3175 Category: Standards Track; pp. 1-36.

Torsten Griem et al.; RSVP over IPsec Tunnel Mode Using RFC 3175; Boeing Phantom Works; pp. 1-5.

Manner, J., Fu, X., "Analysis of Existing Quality-of-Service Signaling Protocols," *RFC4094*, May 2005, 33 pages.

Hancock, R., Karagiannis, G., Loughney, J., Van Den Bosch, S., "Next Steps in Signaling (NSIS): Framework", *RFC4080*, Jun. 2005, 44 pages.

Shen, C., Schulzrinne, H., Lee, S., Bang, J., "NSIS Operation Over IP Tunnels: draft-shen-nsis-tunnel-00", Jul. 2005, 18 pages.

* cited by examiner

| BINDING TYPE VALUE | INDICATION |
|---|---|
| 0×01 | END-TO-END-TUNNEL BINDING |
| 0×02 | BI-DIRECTIONAL BINDING |
| 0×03 | AGGREGATION OF DATA SESSION |
| 0×04 | TUNNEL AGGREGATION PERFORMED OVER IP TUNNELING PATH |
| 0×05~ | UNUSED |

METHOD AND APPARATUS OF PERFORMING TUNNEL SIGNALING OVER IP TUNNELING PATH

CROSS-REFERENCE TO RELATED APPLICATIONS

This application claims the benefit under 35 U.S.C. §119(e) of U.S. Provisional Application No. 60/728,749, filed on Oct. 21, 2005, in the U.S. Patent and Trademark Office, and under 35 U.S.C. §119(a) of Korean Patent Application No. 10-2006-0052065, filed on Jun. 9, 2006, in the Korean Intellectual Property Office, the entire disclosures of both of which are hereby incorporated by reference.

BACKGROUND OF THE INVENTION

1. Field of the Invention

The present invention relates to an apparatus and method for performing tunnel signaling over an IP tunneling path. More particularly, the present invention relates to an apparatus and method for performing tunnel signaling by generating and transmitting over an IP tunneling path a tunnel signaling flow corresponding to an end-to-end signaling flow.

2. Description of Related Art

As Internet technologies are becoming more widespread, a next-generation communication network is being developed as an "all-IP" network having a structure to which Internet Protocol (IP)-based core networks and various access networks are integrated. In an all-IP network, a wired network such as public switched telephone network (PSTN) and a wireless network supporting, for example, International Mobile Telecommunication-2000 (IMT-2000) are linked to the IP-based core network to function as one integrated IP network.

Integration of different types of networks frequently occurs between a network supporting an IP version 6 (IPv6) address system used for supporting mobility and quality-of-service (QoS), and a conventional IP version 4 (IPv4) network, as well as between an IP network and a non-IP network. Accordingly, a network linking technology for providing integrated Internet service through an entire network comprising network apparatuses supporting IPv4 and network apparatuses supporting IPv6 is required.

IP tunneling technology has been in the spotlight as a technology for achieving integration between an IP network and a non-IP network or IP networks of different types. IP tunneling is an encapsulation method of transmitting a packet via a virtual pipe between two nodes on a network. A packet transmission path between the two nodes is called an IP tunneling path or an IP tunnel. Packets transmitted over the IP tunneling path include conventional data packets and signaling packets containing signaling messages for performing particular operations such as QoS and resource reservation.

Typically, a conventional data packet is transmitted over the IP tunneling path by adding a tunnel IP header to a data packet in a suitable form according to the type of network forming the IP tunneling path. For example, when an IPv6 data packet passes through an IP tunneling path operating according to an IPv4 protocol, an IPv4 header including addresses of both end points of the IP tunneling path is added to the IPv6 data packet.

However, the described method has an aspect not suitable for transmitting a signaling packet including a signaling message associated with maintaining and managing a network. Specifically, according to the described method, it is not possible to reflect an operation associated with the signaling message on the IP tunneling path by dealing with a signaling packet as a conventional data packet. For example, since information associated with signaling operations, such as reserving network resources to perform QoS with respect to an IP tunneling path and transmitting a router alert option or a certain protocol number, is encapsulated by a tunnel IP header, it is not shown on nodes on the IP tunneling path. Therefore, the described signaling operations may not be performed over the IP tunneling path.

In addition, as in the case of a conventional QoS method, when classifying a data packet transmitted over an IP tunneling path according to a service flow type corresponding to the data packet to perform scheduling for each type, if an IP packet transmitted over the IP tunneling path is encapsulated by a tunnel IP header, the service flow type is not recognized on the IP tunneling path. Therefore, the described scheduling operations may not be suitably performed.

On the other hand, a User Datagram Protocol (UDP) header may be added for recognizing a QoS data packet on a tunneling path. However, since the UDP header is relatively large, there is a considerable increase in overhead by adding the UDP header to all packets passing the IP tunneling path. Particularly, this type of tunneling method is not suitable since the overhead due to adding the UDP header becomes larger with respect to a service of transmitting a small packet, such as voice over IP (VoIP).

On the other hand, there has been disclosed a method of recognizing an encapsulated message on an IP tunneling path by encapsulating a packet using a Security Parameters Index (SPI) field of an IP Security (IPSEC) protocol proposed by the Internet Engineering Task Force (IETF) for secure transmission and reception of packets in an IP layer. According to this method, a fine signaling over an IP tunneling path is possible without any overhead due to adding an additional header. However, the method can be applied to only an IP tunneling path supporting the IPSEC protocol.

A conventional resource reservation protocol (RSVP) using the described methods of adding an IP header or a UDP header to an IP packet, or using an IPSEC SPI field cannot effectively support mobility of a host, since the conventional RSVP does not support sender-initiated signaling that will be described later, and does not have consideration for the mobility, for example, a session identifier value varies with handoff of a mobile node.

Also, the above described conventional art does not provide a data object for simultaneously supporting an individual tunnel signaling flow and a plurality of aggregated tunnel signaling flows, therefore when a tunneling section and an aggregate section between a receiver and a sender of an IP network exist together in or separate from an overlapped form, performing of signaling and data transmitting in the two sections has a problem of relying on different data objects. Consequently, overhead of an IP packet increases for storing information on the above-mentioned relation, thereby causing delay in signaling and data transmission.

Accordingly, an interest for a method of performing tunnel signaling which provides effective support and unified management for an individual tunnel signaling and aggregated tunnel signaling over an IP tunneling path, has increased.

In order to solve the problem of the conventional art, a new technique of performing tunnel signaling through an IP tunneling path is provided.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an apparatus and method for effectively performing signaling and data transmitting over an IP tunneling path.

Exemplary embodiments of the present invention also provide a new session binding data object which can synthetically manage an end-to-end session and a tunnel session.

Exemplary embodiments of the present invention also provide a new session binding data object which can synthetically manage an aggregation of data sessions provided through an end-to-end path or an IP tunneling path.

Exemplary embodiments of the present invention also provide an apparatus and method for performing a resource reservation or a resource release of an aggregate section over an IP tunneling path in a simple and direct way.

According to an exemplary aspect of the present invention, there is provided a method of performing tunnel signaling over an IP tunneling path, the method including transmitting an end-to-end signaling flow through an end-to-end path connected to the IP tunneling path, generating a tunnel signaling flow corresponding to the end-to-end signaling flow, and transmitting the generated tunnel signaling flow through the IP tunneling path, wherein the end-to-end signaling flow and the tunnel signaling flow respectively include a binding data object storing binding information for an end-to-end session associated with the end-to-end signaling flow or a tunnel session associated with the tunnel signaling flow.

According to another exemplary aspect of the present invention, there is provided a network apparatus including an end-to-end interface transmitting and receiving an end-to-end signaling flow through an end-to-end path connected to the IP tunneling path, a tunnel interface transmitting and receiving a tunnel signaling flow through the IP tunneling path, a tunnel signaling performing unit performing operations associated with a tunnel signaling message by referring to the tunnel signaling message included in the tunnel signaling flow and a tunnel signaling control unit generating the tunnel signaling flow corresponding to the end-to-end signaling flow, and controlling the tunnel signaling based on binding information for an end-to-end session associated with the end-to-end signaling flow or a tunnel session associated with the tunnel signaling flow.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
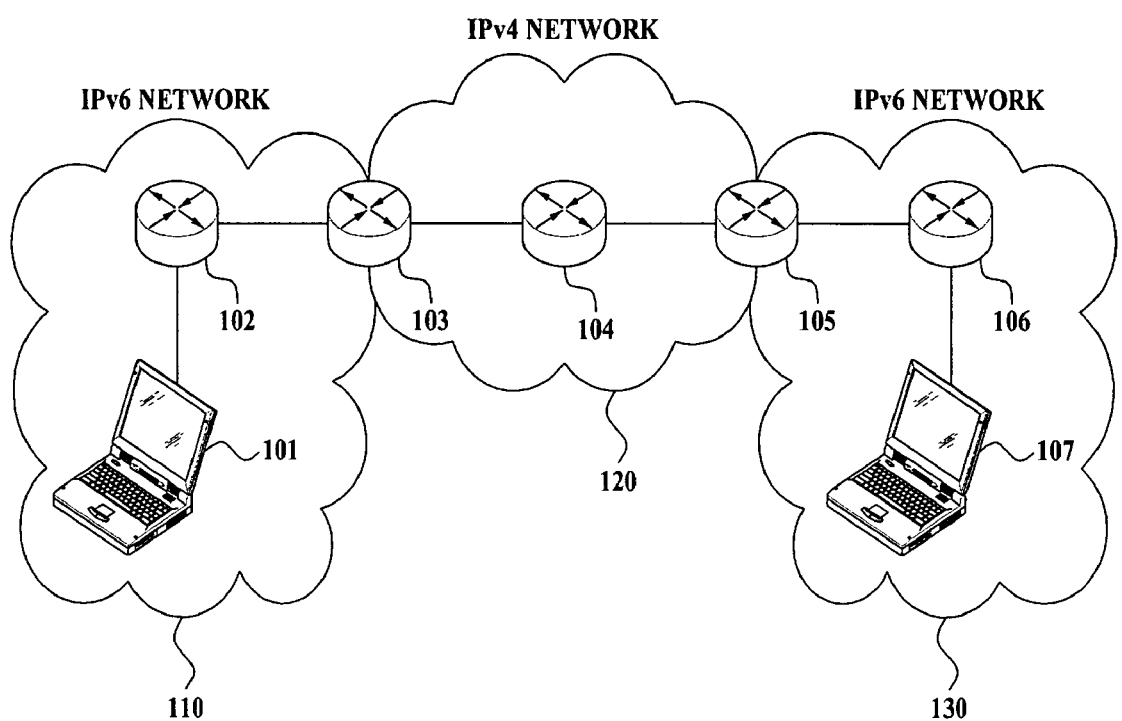
FIG. 1 is a diagram illustrating an embodiment of a network to which a method of performing tunnel signaling, according an exemplary embodiment of the present invention, is applied.

FIG. 1 is a diagram illustrating an exemplary embodiment of a network to which a method of performing tunnel signaling, according an exemplary embodiment of the present invention, is applied. The network has a structure formed of end-to-end paths 110 and 130 and an IP tunneling path 120, the end-to-end paths 110 and 130 operating according to an IPv6 protocol and the IP tunneling path 120 operating according to an IPv4 protocol.

As illustrated in FIG. 1, the IP tunneling path 120 includes a tunnel entry node 103, a tunnel exit node 105 and at least one intermediate node 104. The tunnel entry node 103 allows a packet transmitted from a sender 101 of end-to-end paths 110 and 130 to enter into the IP tunneling path 120, the tunnel exit node 105 releases the packet transmitted through the IP tunneling path 120 to transmit to a receiver 107 of the end-to-end paths 110 and 130, and the at least one intermediate node 104 transmits a data packet or a signaling packet between the tunnel entry node 103 and the tunnel exit node 105. An exemplary end-to-end path and IP tunneling path may be formed of a network supporting the IPv4 and IPv6 protocols, respectively. However, end-to-end paths supporting the IPv6 protocol and IP tunneling path supporting the IPv4 protocol are illustrated in FIG. 1 as a non-limiting example for ease of description. Furthermore, exemplary embodiments may include a mobile IPv4 network in which the end-to-end path and IP tunneling path operate on a basis of an IP network, a mobile IPv6 network, and other possible types of different IP networks.

Operations of the method of performing tunnel signaling according to exemplary embodiments of the present invention will be described in detail below. Initially, the method of performing tunnel signaling includes transmitting an end-to-end signaling flow through the end-to-end path. Therefore, an end-to-end signaling flow may be transmitted from the entry node 103 or exit node 105 of the IP tunneling path 120 to the sender 101 or receiver 107 of the end-to-end paths 110 and 130.

Specifically, as illustrated in FIG. 1, when the end-to-end paths 110 and 130 are formed of the IPv6 network, the end-to-end signaling flow may be transmitted according to the IPv6 protocol, through nodes on the end-to-end paths 110 and 130 supporting the IPv6 network. Also, when the end-to-end paths 110 and 130 are formed of the IPv4 network, the end-to-end signaling flow may be transmitted according to the IPv4 protocol. In this case, the signaling flow indicates packets including a signaling message, and the signaling message indicates a message transmitted between network configuration elements, for performing signaling. The terminology 'signaling' used in the specification may be applicable to general operations of exchanging control information with respect to operation or management of a network apparatus, including general data, between network configuration elements. Specifically, the signaling may include exchanging of control information associated with a network security or operations associated with reservation, modification and release of network resources for performing Quality of Service (QoS) and the like. Hereinafter, the signaling will be mainly described from a viewpoint of the QoS and the resource reservation. However, the present invention may not be limited to only exemplary embodiments as below since the present invention is applicable to general signaling.

The signaling flow in the specification indicates an end-to-end signaling flow or a tunnel signaling flow. The end-to-end signaling flow indicates a signaling flow transmitted between the sender 101 and the receiver 107. Network ends include the sender 101 and the receiver 107 through the end-to-end paths 110 and 130. End-to-end paths in a broad sense indicate an entire network path connecting the sender 101 and the receiver 107. However, the end-to-end paths used in the specification may indicate paths, excluding the IP tunneling path 120, of the entire network path.

The tunnel signaling flow may indicate a signaling flow transmitted between the tunnel entry node 103 (referred to as 'entry node') and the tunnel exit node 105 (referred to as 'exit node') of the IP tunneling path 120. In order to properly provide an end-to-end service, a signaling message is required to be processed at not only nodes 102 and 106 on the end-to-end path, but also nodes 103, 104 and 105 on the IP tunneling path 120. However, the end-to-end signaling flow may not processed at the nodes 103, 104 and 105 on the IP tunneling path 120 since the IP tunneling path 120 is formed of a different network between the end-to-end paths 110 and 130.

Accordingly, an exemplary method of performing tunnel signaling of the present invention includes generating a tunnel signaling flow corresponding to the end-to-end signaling flow, and transmitting the generated tunnel signaling flow through the IP tunneling path. Since the generated tunnel signaling flow is transmitted only on the IP tunneling path 120, the generated tunnel signaling flow may include corresponding information with the end-to-end signaling flow for the end-to-end signaling. The corresponding information may include a tunnel flow identifier of the tunnel signaling flow and a session identifier of the end-to-end signaling flow.

The session identifier is a typical identifier of a service session associated with the end-to-end signaling flow and identifies a transmitted end-to-end signaling flow for smoothly providing a service based on an end-to-end connection.

A tunnel flow identifier, stored with the session identifier, is a typical identifier of the tunnel signaling flow The tunnel flow identifier is updated or newly generated when a configuration of the IP tunneling path 120 is changed, in other words when one or both of the entry node 103 and the exit node 105 are changed. Namely, the tunnel flow identifier may change its value according to address information of the IP tunneling path 120. Conversely, the session identifier is maintained as an identical value while an end-to-end service session is continued.

In an exemplary method of performing tunnel signaling of the present invention, seamless end-to-end signaling may be smoothly provided in a mobile IP environment, for example a portable Internet system supporting a mobile IP network, since the end-to-end signaling flow is separated from the tunnel signaling flow by distinguishing the session identifier from the tunnel flow identifier. Applications of the IP environment of the present invention will be described in detail below.

In an exemplary method of performing tunnel signaling of the present invention, a signaling message may be identified at each node on the IP tunneling path without increasing overhead by employing an additional UDP header. Conversely, a conventional tunneling method is applied to a general data flow. Specifically, in an exemplary method of performing tunnel signaling of the present invention, a high quality service may be provided to a user since the end-to-end QoS, with respect to a multimedia application service, is supported with a type being suitable for a multimedia application, by reducing the packet overhead.

As described above, signaling of the IP tunneling path 120 and the end-to-end paths 110 and 130 may be effectively connected since the session identifier and the tunnel flow identifier, that are distinguished from each other, are stored together as corresponding information of the end-to-end signaling flow and the tunnel signaling flow, respectively.

According to an exemplary embodiment of the present invention, a data field for storing the tunnel flow identifier may be selected from a data field list including a plurality of data field candidates.

As an example, a Differentiated Service Code Point (DSCP) field of an IP header of the IP packet configuring the tunnel signaling flow may be selected as a data field for storing of the tunnel flow identifier. The DSCP field is a field used for providing QoS in a differentiated service and is included in both the IPv4 protocol and the IPv6 protocol. Therefore the DSCP field may be widely applicable to various IP tunneling paths.

As another example, a flow label of the IPv6 header may be selected as a tunnel flow identifier field for storing a tunnel flow identifier. Since the flow label is allocated with a greater number of bits than the DSCP field, a total number of tunnel signaling flows, allowed to be transmitted through the IP tunneling path 120, is greater. Accordingly, when the IP tunneling path 120 supports the IPv6 protocol, the tunnel signaling may be effectively performed by using the flow label of the IPv6 header.

The data field for storing the tunnel flow identifier may be selected by referring to at least any one of the IP header of the end-to-end signaling flow, network types configuring the IP tunneling path, and service types associated with the end-to-end signaling flow. The tunnel flow identifier stored in the selected data field from the plurality of data field candidates may be transmitted with source and destination addresses to at least one node on the IP tunneling path 120. The source and destination addresses may be addresses of the entry node or the exit node.

When the DSCP field and the IPv6 flow label are not supported, a Security Parameters Index (SPI) of an IP Security Protocol (IPSEC) header or a User Datagram Protocol (UDP) header may be selected as a data field for storing of the tunnel flow identifier.

On the other hand, since it is not possible to process all data flows included in at least one data session on a per-flow basis in a section on which traffic is concentrated, for example around a core network, flows sharing common characteristics such as QoS characteristics are bonded to one class to perform operations such as a packet scheduling or the like. The bonding operation is referred to as 'aggregation' and a section that aggregates the data section is referred to as an 'aggregate section'.

The aggregate section may be located on the end-to-end path connecting the sender 101 and receiver 107, and may or may not be in an overlapped form. Also, aside from the aggregation, when an association is established between different service sessions, and when processing through one signaling is advantageous, a plurality of sessions may be bound to be processed by using a session binding method.

In an exemplary embodiment of the present invention, in order to synthetically manage signaling over the IP tunneling path and the aggregate section and signaling in a session binding section, a configuration of a binding data object, included in the end-to-end signaling flow and/or the tunnel signaling flow, is provided.

Figures 2, 3:
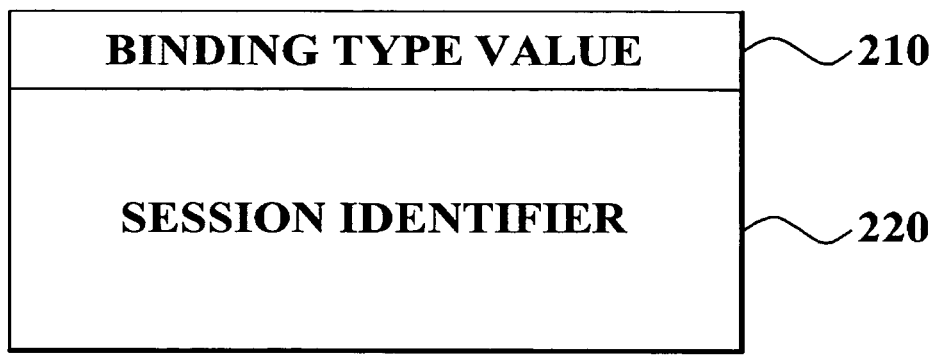
FIG. 2 is a diagram illustrating an exemplary field format of a binding data object which is applied to a method of performing tunnel signaling according an exemplary embodiment of the present invention.
FIG. 3 is a diagram illustrating types of bindings included in the binding data object of FIG. 2.

FIG. 2 is a diagram illustrating a field format of a binding data object 200 which is applied to a method of performing tunnel signaling according an exemplary embodiment of the present invention.

Referring to FIG. 2, a binding data object 200 includes a binding type value field 210 and a session identifier field 220. The session identifier field 220 stores values of typical end-to-end session identifiers or tunnel session identifiers. The binding type value field 210 stores values of each session binding to process various types of session bindings using a single binding data object. The binding data object may be included in a payload of an IP packet forming the end-to-end signaling flow or the tunnel signaling flow.

FIG. 3 is a table illustrating types of bindings included in the binding data object of FIG. 2. Referring to FIG. 3, the types of bindings stored in the binding type value field 210 of FIG. 2 may include an end-to-end-tunnel binding value 0x01, a bi-directional binding 0x02, an aggregate binding 0x03, and a tunnel aggregation binding 0x04. Hereinafter, the types of bindings will be described by referring to the accompanying figures.

Figure 4:
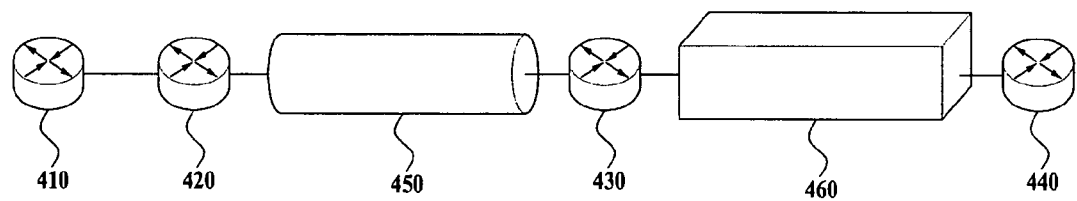
FIG. 4 is a diagram illustrating an IP tunneling path and an aggregate section according to an exemplary embodiment of the present invention.

FIG. 4 is a diagram illustrating an IP tunneling path and an aggregate section according to an exemplary embodiment of the present invention. As illustrated in FIG. 4, according to an exemplary embodiment of the present invention, the IP tunneling path 450 is not overlapped with the aggregate section 460.

An end-to-end signaling flow generated from a sender 410 is transmitted to an entry node of the IP tunneling path 450 through a node 420 on the end-to-end path, and tunnel signaling is performed over the IP tunneling through the tunnel signaling flow generated from the entry node. When the tunnel signaling is performed over the IP tunneling, in the binding type value field 210 of the binding data object 200 of FIG. 2 of the tunnel signaling flow, the end-to-end-tunnel binding value 0x01, indicating a binding type between the end-to-end session and the tunnel session, is stored.

An end-to-end-tunnel binding value 0x01 is stored in the end-to-end signaling flow received by the entry node of the IP tunneling path and forwarded to the exit node of the IP tunneling path before or after the tunnel signaling is terminated. The exit node transmits the end-to-end signaling flow to a starting node of an aggregate section 460 passing through a intermediate node 430 on the end-to-end path. The starting node of the aggregate section 460 stores an aggregate binding value 0x03 in a binding type value field of the end-to-end signaling flow.

On aggregate sections, end-to-end signaling is performed through a single signaling flow with respect to an aggregate data session and an end-to-end signaling is performed with respect to each service session, with respect to paths excluding the aggregate sections.

Though not illustrated in FIG. 3, a binding value 0x00 indicating that a session binding does not exist may be stored in the binding type value field, on paths excluding the IP tunneling path and the aggregate sections. Specifically, the binding value 0x00 may be stored in the binding type value field 210 of FIG. 2, at the exit node of the IP tunneling path or an ending node where the aggregate section ends.

Also, the above described operation is applied when signaling starts from a receiver 440.

Figure 5:
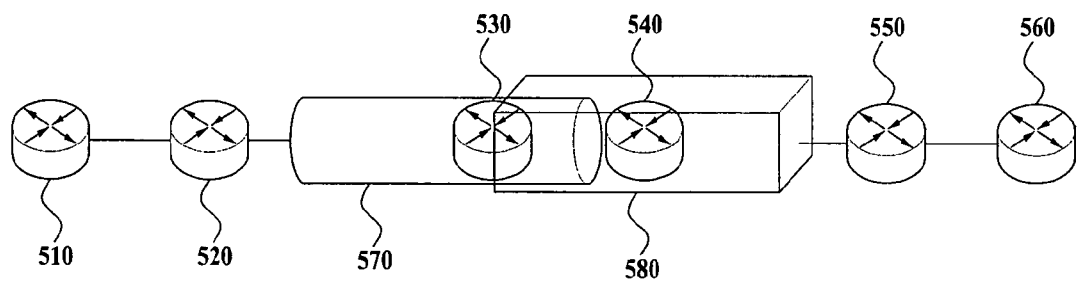
FIG. 5 is a diagram illustrating an IP tunneling path and an aggregate section according to another exemplary embodiment of the present invention.

FIG. 5 is a diagram illustrating an IP tunneling path and an aggregate section according to another exemplary embodiment of the present invention. An IP tunneling path 570 and an aggregate section 580 of FIG. 5 are partially overlapped in some sections.

At an entry node of the IP tunneling path 570, a tunnel signaling flow is generated corresponding to a received end-to-end signaling flow which is transmitted from a sender 510 and passing through a intermediate node 520 on an end-to-end path. In the binding type value field 210 of FIG. 2 of the received end-to-end signaling flow at the entry node and the generated tunnel signaling flow, the end-to-end-tunnel binding value 0x01 is commonly stored. The entry node transmits the generated tunnel signaling flow to at least one node over the IP tunneling path 570 to perform tunnel signaling. As illustrated in FIG. 5, when a starting node 530 of the aggregate section 580 is placed on the tunnel signaling path, the aggregate binding 0x03 is stored in the binding type value field 210, in addition to the end-to-end-tunnel binding value 0x01. Also, the tunnel aggregation binding value 0x04 may be additionally defined and used, with respect to the aggregate section 580 located on the IP tunneling path 570.

Since the exit node of the IP tunneling path 570 is still located within the aggregate section 580, the exit node may establish a binding of the end-to-end signaling flow as the aggregate binding 0x03 in order to transmit the end-to-end signaling flow, forwarded from an entry node, through the end-to-end path.

A binding value 0x00 may be recorded in the binding type value field 210 of the end-to-end signaling flow, out of the aggregate section 580, passing through an intermediate node 550 and transmitted to a receiver 560.

When signaling starts from the receiver 560, at the tunnel exit node 540 located within the aggregate section 580, the end-to-end-tunnel binding value 0x01 is appended to the aggregate binding 0x03 or the tunnel aggregation binding value 0x04 may be recorded in the binding type value field 210, at the starting node 530 of the aggregate section located on the IP tunneling path 570, the end-to-end-tunnel binding value 0x01 may be recorded.

Figure 6:
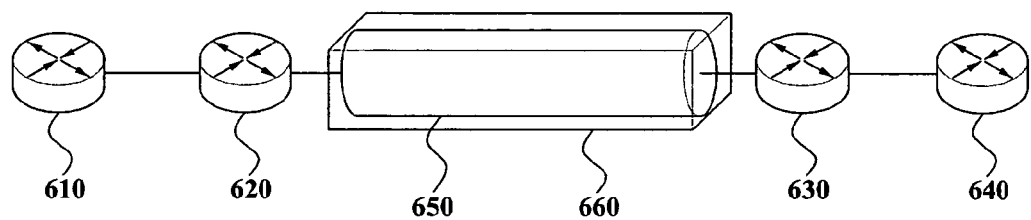
FIG. 6 a diagram illustrating an IP tunneling path and an aggregate section according to still another exemplary embodiment of the present invention.

FIG. 6 a diagram illustrating an IP tunneling path and an aggregate section according to still another exemplary embodiment of the present invention. In FIG. 6, an IP tunneling path 650 and an aggregate section 660 are completely overlapped.

According to the exemplary embodiment of the FIG. 6, an entry node of the IP tunneling path 650 becomes a starting node where the aggregate section 660 starts, an exit node of the IP tunneling path 650 becomes an end node where the aggregate section 660 ends.

The entry node of the IP tunneling path 650 receives an end-to-end signaling flow transmitted from a sender 610, passing through a intermediate node 620. Since the entry node of the IP tunneling path 650 is equal to the starting node of the aggregate section 660, a binding of an end-to-end signaling flow, received by the entry node, and a generated tunnel signaling flow may be established as the tunnel aggregation binding value 0x04. Since the exemplary embodiment may be a specific example of the IP tunneling path 650 or the aggregate section 660, the binding of the end-to-end signaling flow and the tunnel signaling flow may be established as the end-to-end-tunnel binding value 0x01 or the aggregate binding value 0x03.

A signaling operation, for example a resource reservation, a QoS establishment, and the like, may be performed with respect to an aggregated data session on the IP tunneling path by using the tunnel signaling flow having the established binding. Also, an end-to-end signaling flow having an identical binding is forwarded from the entry node to the exit node of the IP tunneling path 650.

A binding of the forwarded end-to-end signaling flow may be established as the binding value 0x00 transmitted to a receiver 640, passing through a intermediate node 630.

The above described operation is also applicable when signaling starts from the receiver 640.

As illustrated FIG. 6, when the IP tunneling path 650 and the aggregate section 660 are overlapped, according to another exemplary embodiment of the present invention, tunnel signaling performed through the IP tunneling path 650 may be formed of serial message flows for aggregating a plurality of data sessions over the IP tunneling path.

Namely, the performing of tunnel signaling according to an exemplary embodiment of the present invention may include receiving an end-to-end aggregation message aggregating the plurality of the data sessions on the end-to-end path, generating a tunnel aggregation message aggregating the plurality of the data sessions on the IP tunneling path, based on the received end-to-end aggregation message and transmitting the generated tunnel aggregation message to at least one node on the IP tunneling path.

As an example of the tunnel aggregation message, the tunnel aggregate message may include at least one of an aggregate association generate message, an aggregate association modify message, and an aggregate association delete message for the plurality of the data sessions.

Also, as illustrated in FIG. 6, when the IP tunneling path and the aggregate section are completely overlapped, according to another exemplary embodiment of the present invention, a reservation, a modification, and a release of network resources may be dynamically performed for providing aggregation of the data session over an IP tunneling path. Management of the dynamic network resources may be simply performed through an exchange of tunnel signaling messages.

Figure 7:
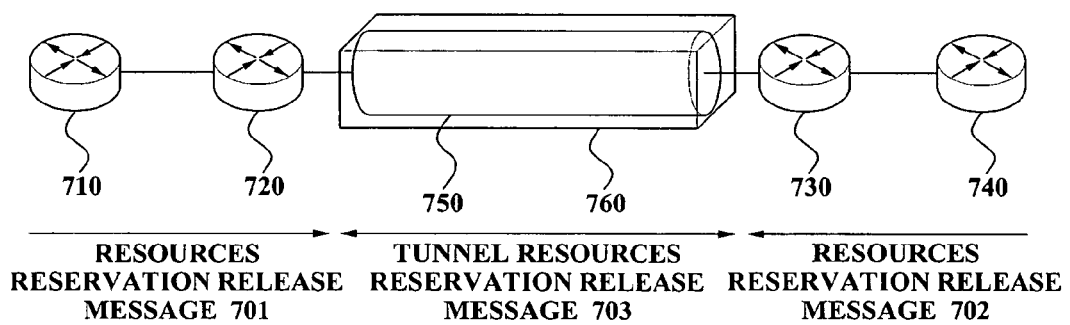
FIG. 7 is a diagram illustrating an IP tunneling path and an aggregate section according to yet another exemplary embodiment of the present invention.

FIG. 7 is a diagram illustrating an IP tunneling path and an aggregate section according to yet another exemplary embodiment of the present invention. For reference, only a network resources reservation release is taken as an example as below. However, it is evident to those skilled in the art that the same idea is also applicable to a case of establishing an additional reservation and modification of aggregate resources.

Referring to FIG. 7, an entry node of an IP tunneling path 750 receives an end-to-end resource reservation release message 701 transmitted from a sender 710, passing through a intermediate node 720. The end-to-end resource reservation release message 701 may be associated with an operation of a resource release, the resource being associated with a session that is no longer used due to a state change of a routing, from initially reserved network resources for aggregation of the plurality of data sessions over the IP tunneling path 750. Also, when a data session is no longer provided through an aggregation section, the end-to-end resource reservation release message 701 may be a network resources release message associated with the data session, the data session being provided to a mobile terminal through handoff of the mobile terminal supporting a mobile IP network.

The entry node may generate a tunnel resource reservation release message 703 transmitted to at least one node on the IP tunneling path 750, on a basis of the end-to-end resource reservation release message 701. Also, when an end-to-end resource reservation release message 702 is transmitted to an exit node, from a receiver 740 and passing through an intermediate node 730, the tunnel resource reservation release message 703 may be generated by the exit node.

According to an exemplary embodiment of the present invention, the resources reservation release message 702 may be a type of a resource release flag being added to the tunnel resources reservation release message 703. Depending upon the exemplary embodiment, aggregate resources on the IP tunneling path 750 may be quickly and simply released without generating an additional resources reservation release message 702.

As illustrated in FIG. 7, initially a reserved aggregate resource with respect to an aggregate section 760, overlapped with the IP tunneling path 750, is not maintained until the aggregate section 760 is released. But the initially reserved aggregate resource is dynamically released, modified, or added when a state change of a routing or when the mobile terminal performs a handoff. Therefore, the network resources may be effectively operated and more service sessions may be processed by using identical network resources. The above method of releasing a resource is for utilizing the resource in an aggregate section and may be utilized in all types of aggregate sections, including FIGS. 4 and 5.

Referring back to FIG. 3, the binding type value applied to the method of performing tunnel signaling according to an exemplary embodiment of the present invention may be a bi-directional binding value 0x02, indicating a binding between a plurality of the end-to-end sessions or the tunnel sessions of different directions.

The bi-directional binding value 0x02 may be applied to all cases illustrated in FIGS. 4 through 6 and a case of performing a QoS establishment or a resource reservation of a bi-directional session by using a single signaling flow.

Also, a section of an unused binding values 0x05~ illustrated in FIG. 3 may be used as a reserved area for a binding type value corresponding to an additionally defined binding type. As an example, a dependant binding, indicating a binding between a plurality of sessions in which a specific session is provided only when other sessions are provided, may be defined as the unused binding 0x05~.

The binding which is additionally defined using the unused binding values 0x05~ may be associated with an application-specific session binding type, or when a session binding type supported by a signaling protocol is added.

Also, an area for the unused binding values 0x05~ may be used for data that is required to be additionally stored with each of the bindings.

An IP tunneling path according to an exemplary embodiment of the present invention may be a mobile IP tunneling path, the mobile IP tunneling path connecting a mobile node (MN), supporting the IP protocol, including a home agent (HA). A mobile IP environment according to an exemplary embodiment of the present invention may include a mobile IPv4 protocol, a mobile IPv6 protocol, and any type of IP environment supporting mobility.

A method of tunnel signaling according to an exemplary embodiment of the present invention is suitable for application to a mobile environment. As an example, a continuity of an end-to-end service session may be maintained since a session identifier associated with an end-to-end signaling flow is not changed when a mobile IP tunneling path, having the mobile node as an entry node or exit node by handoff of a mobile node, is changed.

Also, a packet overhead may be minimized since an additional header is not added for tunnel signaling over an IP tunneling path. Also, a problem of a service delay caused by a handoff of a mobile node may be effectively handled since quicker tunnel signaling is provided in a mobile IP environment where an IP tunneling path frequently changes by supporting methods of parallel signaling and sender-initiated signaling.

A method of tunnel signaling over an IP tunneling path according to the above-described exemplary embodiment of the present invention may be recorded in computer-readable media including program instructions to implement various operations embodied by a computer. The computer-readable media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Other media may include a transmission medium such as optical or metallic lines, wave guides, etc. that can transmit carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Figure 8:
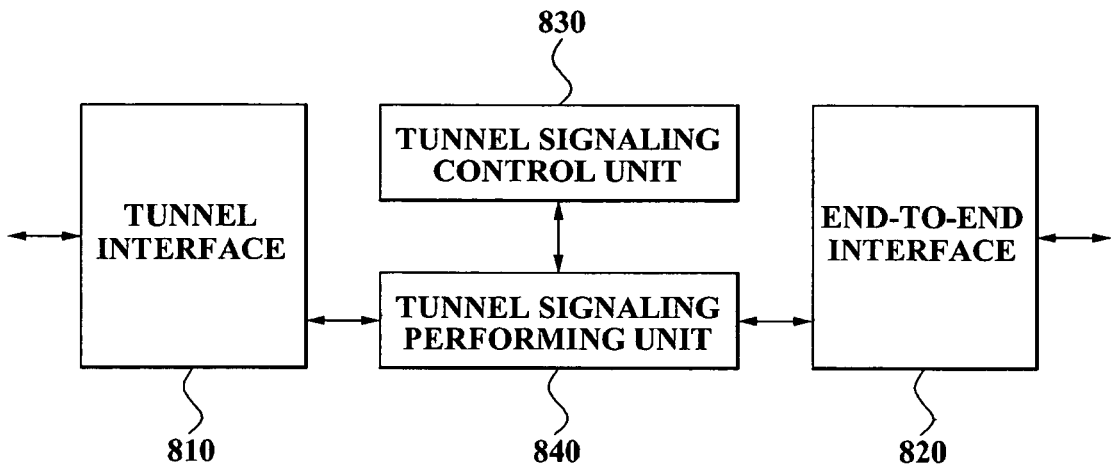
FIG. 8 is a block diagram illustrating an inner configuration of a network apparatus having a function of tunnel signaling according to an exemplary embodiment of the present invention.

Exemplary embodiments of the present invention may be applied to a network apparatus performing tunnel signaling through an IP tunneling path. FIG. 8 is a block diagram illustrating an inner configuration of the network apparatus having a function of tunnel signaling according to an exemplary embodiment of the present invention.

A tunnel interface 810 in FIG. 8 is a component of the network apparatus for transmitting and receiving a tunnel signaling flow through the IP tunneling path. The tunnel interface 810 connects the network apparatus, according to an exemplary embodiment of the present invention, with the IP tunneling path.

According to an exemplary embodiment of the present invention, an end-to-end interface 820 transmits and receives an end-to-end signaling flow through, and connects the network apparatus with, an end-to-end path. When the network apparatus according to an exemplary embodiment of the present invention is located at an entry node 103, the end-to-end interface 820 transmits or receives a data flow or an end-to-end signaling flow to or from a sender 101, respectively. Also, when the network apparatus according to an exemplary embodiment of the present invention is located at an exit node 105, the end-to-end interface 820 transmits or receives the data flow or the end-to-end signaling flow to or from a receiver 107, respectively.

The tunnel interface 810 and the end-to-end interface 820 are respectively formed of a network interface having a functionality of processing data flows or signaling flows, according to an addressing method including at least one of the IPv4, the IPv6, the mobile IPv4, and the mobile IPv6 protocols.

A tunnel signaling performing unit 840 performs operations of proper signaling, according to a signaling message included in the tunnel signaling flow, for example, and may include a logic for extracting a signaling message, a logic for reading the signaling message and a logic for updating QoS information and resource reservation information of the network apparatus according to the signaling message.

A tunnel signaling control unit 830 controls the tunnel interface 810, the end-to-end interface 820 and the tunnel signaling performing unit 840 of components of the network apparatus according to an exemplary embodiment of the present invention.

Also, the tunnel signaling control unit 830 generates a tunnel signaling message for signaling over the IP path. The tunnel signaling control unit 830 has an inner configuration as described below.

Figure 9:
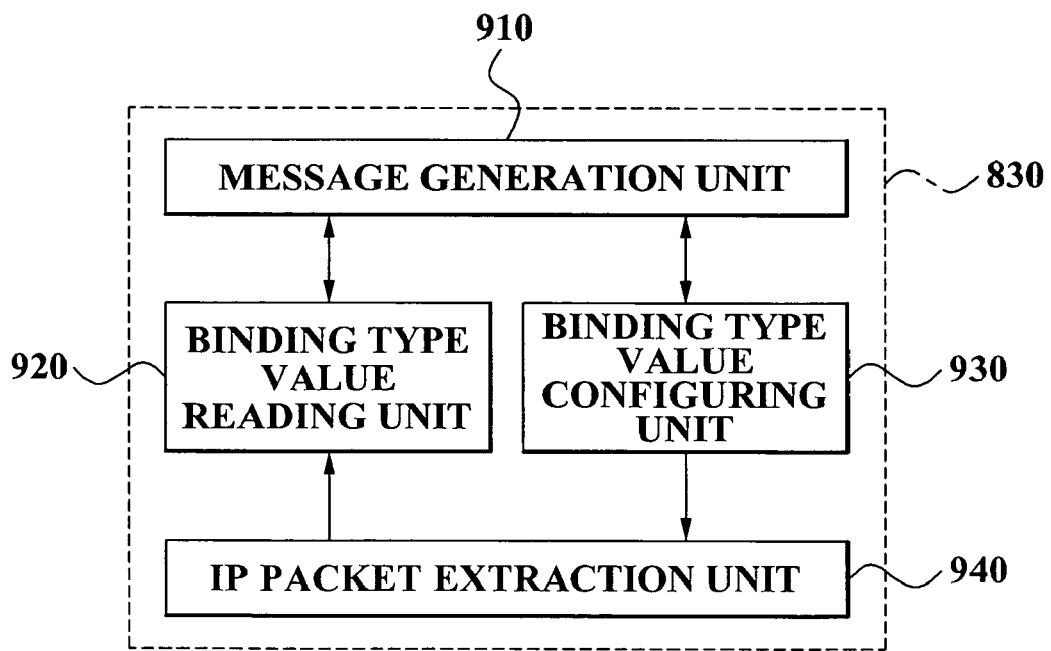
FIG. 9 is a block diagram illustrating an inner configuration of an exemplary tunnel signaling control unit of FIG. 8.

FIG. 9 is a block diagram illustrating an inner configuration of the tunnel signaling control unit 830 of FIG. 8. An IP packet extraction unit 940 extracts an IP packet from an end-to-end signaling flow or a tunnel signaling flow.

A binding type value reading unit 920 reads a binding type value included in the extracted IP packet. As an example, the binding type value reading unit 920 may extract the binding type value from a tunneling data object field included in a payload of the IP packet.

A binding type value configuring unit 930 receives a binding type value to be configured or to be modified, and may configure or modify the binding type value stored in the data field 210 of FIG. 2 of the IP packet by using the received binding type value.

The binding type value according to an exemplary embodiment of the present invention may include an end-to-end-tunnel binding, a bi-directional, an aggregate binding and a tunnel aggregate binding: the end-to-end-tunnel binding indicating a binding between an end-to-end session and a tunnel session, the bi-directional binding indicating a binding between a plurality of the end-to-end sessions or the tunnel sessions of different directions, the aggregate value indicating a type aggregating a plurality of data sessions, and the tunnel aggregate binding indicating the aggregating is performed over the IP tunneling path.

A message generation unit 910 generates a tunnel signaling message of the tunnel signaling flow by referring to a signaling message included in the received end-to-end signaling flow. As an example, the tunnel signaling message of the tunnel signaling flow may be generated by copying a signaling message of the end-to-end signaling flow.

The tunnel signaling message may include a QoS message associated with a QoS on the IP tunnel path, a network resource reservation message reserving, modifying, and releasing network resources required for performing QoS, and a network security message performing operations over a tunneling path associated with secure data flow transmitted through the IP tunneling path.

Also, the message generation unit 910 may generate a tunnel flow identifier associated with a tunnel signaling flow.

The tunnel flow identifier is a newly generated value or a value modified when the IP tunneling path changes, and may be stored in the data object with a session identifier of a service session associated with the end-to-end signaling flow.

Also, the message generation unit 910 may control transmitting and receiving of the tunnel signaling message by referring to the binding type value read by the binding type value reading unit 920. Specifically, the message generation unit 910 performs operations of reserving, modifying, and releasing the network resources for binding between the tunnel session and the end-to-end session or aggregation of the data session, when the IP tunneling path is overlapped with an aggregate section, configuring, or modifying the binding type value of the tunnel signaling flow including the generated tunnel signaling message.

The network apparatus according to an exemplary embodiment of the present invention may include network apparatuses, for example a router operated on a wired IP network, a wireless network apparatus of an access control router (ACR), a gateway GPRS support node (GGSN), and the like.

Hereto, the network apparatus having a function of the IP tunnel signaling according to an exemplary embodiment of the present invention is described by referring to FIGS. 8 and 9. Since the above described exemplary embodiments, described with reference to FIGS. 1 through 7, may be applied to the network apparatus according to the present invention, a detailed description associated with the network apparatus will be omitted hereinafter.

According to an exemplary embodiment of the present invention, an end-to-end QoS, a network resource reservation and a security management may be performed since tunnel signaling over an IP tunneling path is performed by interoperating with an end-to-end signaling, accordingly QoS provided to a user may be guaranteed.

Also, according to an exemplary embodiment of the present invention, types of networks, a traffic state, and an adaptable tunnel signaling depending upon a service application may be controlled since a data field for storing of a tunnel flow identifier is selected from a plurality of selectable data fields.

Also, according to an exemplary embodiment of the present invention, a mobility of a host may be reliably supported since a session identifier is maintained as an identical value, even in a case of a handoff of a mobile node supporting a mobile IP, while service session is continued.

Also, according to an exemplary embodiment of the present invention, an end-to-end session and a tunneling session may be synthetically managed by using a session binding data object that stores binding information of the end-to-end session and the tunneling session.

Also, according to an exemplary embodiment of the present invention, an aggregation of a data flow provided through an IP tunneling path or an end-to-end path may be effectively managed in a unified manner since binding type values, associated with an aggregate association of the data flow or a data session, are stored in a binding type value field of a session binding object.

Also, according to an exemplary embodiment of the present invention, network resources may be smoothly performed according to a state change of a routing or a mobility of a terminal since a resource reservation or a resource release of an aggregate section is dynamically performed without an additional reservation or release message.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of performing tunnel signaling over an IP tunneling path, the method comprising:
   transmitting an end-to-end signaling flow including a session identifier and a binding data object storing first binding information for an end-to-end session associated with the end-to-end signaling flow through an end-to-end path connected to an IP tunneling path, wherein the first binding information comprises a binding type value indicating a binding type of the end-to-end session;
   generating a tunnel signaling flow including a tunnel flow identifier and a second binding data object storing second binding information for a tunnel session associated with the tunnel signaling flow corresponding to the end-to-end signaling flow, wherein the second binding information comprises a binding type value indicating a binding type of the tunnel session; and
   transmitting the generated tunnel signaling flow through the IP tunneling path;
   wherein the end-to-end signaling flow is separated from the tunnel signaling flow by distinguishing the session identifier from the tunnel flow identifier; and
   the binding type value of the first binding information and the binding type value of the second binding information are stored to process various types of session bindings using a single binding data object.

2. The method of claim 1, wherein the binding type value of the first binding information comprises an end-to-end tunnel binding, indicating a binding between the end-to-end session and the tunnel session.

3. The method of claim 2, wherein the transmitting the generated tunnel signaling flow comprises at least one of changing the binding type value of the first binding information to a tunnel aggregate binding and from a tunnel aggregate binding.

4. The method of claim 3, wherein the binding type value of the first binding information is changed when a starting node or an ending node of an aggregate section aggregating a plurality of data sessions provided through any one of the end-to-end path and the IP tunneling path is located on the IP tunneling path.

5. The method of claim 3, wherein, the binding type value of the first binding information is changed when a tunnel entry node or a tunnel exit node of the IP tunneling path is located in an aggregate section.

6. The method of claim 1, wherein the binding type value of the second binding information comprises an end-to-end tunnel binding, indicating a binding between the end-to-end session and the tunnel session.

7. The method of claim 1, wherein the binding type value of the first binding information is a bi-directional binding indicating a binding between a plurality of end-to-end sessions or tunnel sessions of different directions.

8. The method of claim 1, wherein the binding type value of the first binding information is an aggregate binding indicating an aggregation of a plurality of data sessions provided through the end-to-end path.

9. The method of claim 8, wherein the transmitting the generated tunnel signaling flow comprises:
   receiving an end-to-end aggregation message aggregating a plurality of the data sessions on the end-to-end path;

generating a tunnel aggregation message aggregating the plurality of the data sessions on the IP tunneling path, based on the received end-to-end aggregation message; and transmitting the generated tunnel aggregation message to at least one node on the IP tunneling path.

10. The method of claim 9, wherein the tunnel aggregation message includes at least one of an aggregate association generate message, an aggregate association modify message, and an aggregate association delete message for the plurality of the data sessions.

11. The method of claim 9, wherein the tunnel aggregation message is a resource reservation release message releasing an entirety or a part of reserved network resources on the IP tunneling path.

12. The method of claim 1, wherein the binding type value of the second binding information is an aggregate binding indicating an aggregation of a plurality of data sessions provided through the IP tunneling path.

13. The method of claim 12, wherein the transmitting the generated tunnel signaling flow comprises:
receiving an end-to-end aggregation message aggregating a plurality of the data sessions on the end-to-end path;
generating a tunnel aggregation message aggregating the plurality of the data sessions on the IP tunneling path, based on the received end-to-end aggregation message; and
transmitting the generated tunnel aggregation message to at least one node on the IP tunneling path.

14. The method of claim 13, wherein the tunnel aggregation message includes at least one of an aggregate association generate message, an aggregate association modify message, and an aggregate association delete message for the plurality of the data sessions.

15. The method of claim 13, wherein the tunnel aggregation message is a resource reservation release message releasing an entirety or a part of reserved network resources on the IP tunneling path.

16. The method of claim 1, wherein the session identifier is maintained to be an identical value while the end-to-end session is continued.

17. The method of claim 1, wherein the transmitting the generated tunnel signaling flow comprises:
generating the tunnel flow identifier associated with the tunnel signaling flow; and
selecting a data field for storing of the tunnel flow identifier.

18. The method of claim 17, wherein the selecting the data field for storing of the tunnel flow identifier comprises selecting from a data field list which includes a plurality of data field candidates.

19. The method of claim 18, wherein the data field list includes at least one of a Differentiated Service Code Point (DSCP) field of an IP header, a flow label of an Internet Protocol Version 6 (IPv6) header, a Security Parameters Index (SPI) of an IP Security Protocol (IPSEC) header, and a User Datagram Protocol (UDP) header.

20. The method of claim 1, wherein the tunnel signaling flow comprises at least one of a Quality of Service (QoS) signaling, a network resource reservation signaling and a network security signaling.

21. The method of claim 1, wherein the IP tunneling path comprises at least one of an IPv4 network and an IPv6 network.

22. The method of claim 1, wherein the IP tunneling path comprises a mobile IP tunneling path connecting a mobile node and a home agent supporting the mobile IP.

23. A non-transitory computer-readable storage medium storing a program to perform tunnel signaling over an IP tunneling path, comprising executable instructions configured to cause a computer to:
transmit an end-to-end signaling flow including a session identifier and a binding data object storing first binding information for an end-to-end session associated with the end-to-end signaling flow through an end-to-end path connected to an IP tunneling path, wherein the first binding information comprises a binding type value indicating a binding type of the end-to-end session;
generate a tunnel signaling flow including a tunnel flow identifier and a binding data object storing second binding information for a tunnel session associated with the tunnel signaling flow corresponding to the end-to-end signaling flow, wherein the second binding information comprises a binding type value indicating a binding type of the tunnel session; and
transmit the generated tunnel signaling flow through the IP tunneling path;
wherein the end-to-end signaling flow is separated from the tunnel signaling flow by distinguishing the session identifier from the tunnel flow identifier, and
the binding type value of the first binding information and the binding type value of the second binding information are stored to process various types of session bindings using a single binding data object.

24. A network apparatus performing tunnel signaling over an IP tunneling path, the apparatus comprising:
an end-to-end interface for transmitting and receiving an end-to-end signaling flow through an end-to-end path connected to the IP tunneling path;
a tunnel interface for transmitting and receiving a tunnel signaling flow through the IP tunneling path; a tunnel signaling performing unit for performing operations by referring to a tunnel signaling message in a received tunnel signaling flow; and
a tunnel signaling control unit for generating the tunnel signaling flow corresponding to the end-to-end signaling flow and for controlling the tunnel signaling flow based on binding information for an end-to-end session associated with the end-to-end signaling flow or a tunnel session associated with the tunnel signaling flow;
wherein the end-to-end signaling flow includes a session identifier and a binding data object storing first binding information for an end-to-end session associated with the end-to-end signaling flow through an end-to-end path connected to an IP tunneling path, wherein the first binding information comprises a binding type value indicating a binding type of the end-to-end session, and
the tunnel signaling flow includes a tunnel flow identifier and a second binding data object storing second binding information for a tunnel session associated with the tunnel signaling flow corresponding to the end-to-end signaling flow, wherein the second binding information comprises a binding type value indicating a binding type of the tunnel session.

25. The network apparatus of claim 24, wherein the tunnel signaling control unit comprises:
an IP packet extraction unit for extracting an IP packet from the end-to-end signaling flow or the tunnel signaling flow;
a binding type value reading unit for reading a binding type value associated with the end-to-end session or the tunnel session from a data field of the IP packet;

a binding type value configuring unit for configuring or modifying the binding type value stored in the data field of the IP packet; and a message generation unit for generating a tunnel signaling message for transmission in the tunnel signaling flow by referring to an end-to-end signaling message of the end-to-end signaling flow, and for controlling transmitting and receiving of the tunnel signaling message by referring to the binding type value;

wherein the binding type value of the first binding information and the binding type value of the second binding information are stored to process various types of session bindings using a single binding data object.

26. The network apparatus of claim 25, wherein the generated tunnel signaling message comprises at least one of a QoS message, a network resource reservation message and a network security message.

* * * * *